United States Patent
Dowdy et al.

(10) Patent No.: US 12,301,538 B1
(45) Date of Patent: *May 13, 2025

(54) DISTRIBUTED DOMAIN NAME SYSTEMS AND METHODS

(71) Applicant: United Services Automobile Association (USAA), San Antonio, TX (US)

(72) Inventors: Joshua Jesse Dowdy, Arlington, WA (US); Abraham Isaac Cabanilla, San Antonio, TX (US); Matthew Mosher, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/483,205

(22) Filed: Oct. 9, 2023

Related U.S. Application Data

(63) Continuation of application No. 17/892,824, filed on Aug. 22, 2022, now Pat. No. 11,784,968, which is a continuation of application No. 16/887,905, filed on May 29, 2020, now Pat. No. 11,425,091.

(51) Int. Cl.
*H04L 61/5076* (2022.01)
*H04L 61/4511* (2022.01)

(52) U.S. Cl.
CPC ...... *H04L 61/5076* (2022.05); *H04L 61/4511* (2022.05)

(58) Field of Classification Search
CPC .............. H04L 61/2076; H04L 61/1511
See application file for complete search history.

(56) References Cited

U.S. PATENT DOCUMENTS

| | | |
|---|---|---|
| 7,680,876 B1 | 3/2010 | Cioli et al. |
| 7,684,394 B1 | 3/2010 | Cutbill et al. |
| 8,259,596 B1 | 9/2012 | Oak |
| 8,719,900 B2 | 5/2014 | MacCarthaigh |
| 10,148,493 B1 | 12/2018 | Ennis, Jr. et al. |
| 10,572,353 B2 | 2/2020 | Yadav et al. |
| 10,999,331 B1 | 5/2021 | Marchand et al. |
| 11,425,091 B1 | 8/2022 | Dowdy et al. |
| 2002/0080816 A1 | 6/2002 | Spinar et al. |
| 2005/0149620 A1 | 7/2005 | Kirkland et al. |
| 2005/0203875 A1 | 9/2005 | Mohammed et al. |
| 2010/0115050 A1 | 5/2010 | Sultenfuss et al. |
| 2014/0143135 A1 | 5/2014 | Murphy et al. |
| 2015/0271132 A1 | 9/2015 | Erb |
| 2015/0350154 A1 | 12/2015 | Myla et al. |
| 2016/0316013 A1 | 10/2016 | Sultenfuss et al. |
| 2019/0116153 A1 | 4/2019 | Deverakonda et al. |
| 2021/0021565 A1 | 1/2021 | Chand et al. |
| 2021/0120406 A1 | 4/2021 | Ocak et al. |
| 2021/0168127 A1 | 6/2021 | Jensen et al. |

*Primary Examiner* — Oanh Duong
(74) *Attorney, Agent, or Firm* — Fletcher Yoder, PC

(57) ABSTRACT

The present disclosure relates to methods and systems for providing access to external client machine via a domain name system (DNS) of an internal network. A distributed DNS service maintains distributed DNS entries as external clients log on and/or log off of the internal network. In this manner, internal systems within the internal network may access distributed client devices via the internal network DNS.

20 Claims, 7 Drawing Sheets

DISTRIBUTED DOMAIN NAME SYSTEMS AND METHODS

CROSS-REFERENCES TO RELATED APPLICATIONS

The present application is a continuation of U.S. patent application Ser. No. 17/892,824, titled "Distributed Domain Name Systems and Methods," which was filed on Aug. 22, 2022, which is a continuation of U.S. patent application Ser. No. 16/887,905, titled "Distributed Domain Name Systems and Methods," which was filed on May 29, 2020, which is herein incorporated by reference in their entireties for all purposes.

BACKGROUND

The present disclosure relates generally to systems and methods to facilitate distributed domain name systems (DNS). More specifically, distributed DNS refers to a system that includes DNS entries for distributed clients (e.g., those devices and/or services outside of an internal network firewall). The systems and techniques discussed herein provide specialized DNS features for such distributed clients, such as dynamic DNS updates, Internet Protocol (IP) address updates, etc.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Computer networks provide a connected world of electronic devices and/or services, where an increasing number of activities can be performed via network communication. The identifying information needed to access these electronic devices is oftentimes complex and difficult to remember. Further, this identifying information may change from time to time, causing difficulty in accessing particular electronic devices. The Domain Name System (DNS) is a hierarchical and decentralized naming system for computers, services, or other resources connected to the Internet or a private network. It associates various information with domain names assigned to each of the participating entities. Most prominently, it translates more readily memorized domain names/client names to the numerical IP addresses needed for locating and identifying computer services and devices with the underlying network protocols. Unfortunately, DNS does not translate distributed client names to IP addresses. Thus, distributed clients that join a network have typically been accessible only by their less-memorable client identifiers (e.g., IP addresses) rather than by more readily memorizable client names. Accordingly, new DNS techniques may be desirable.

SUMMARY OF THE INVENTION

Embodiments of this disclosure include systems and methods for providing distributed DNS services for distributed clients (e.g., electronic devices and/or services) that join a network. In particular, the current techniques relate to a distributed DNS service that enables internal network entities (e.g., internal electronic devices and/or services) the ability to access the distributed clients via DNS translated names (e.g., more-memorizable client names rather than less-memorizable IP addresses). The distributed DNS service identifies distributed clients that access the network and maintains DNS entries for these distributed clients, such that internal systems may access the DNS entries for translated identifiers (e.g., distributed client names versus IP addresses). Thus, the internal systems may access the distributed client systems via the translated identifier.

BRIEF DESCRIPTION OF DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure are described above. In an effort to provide a concise description of these embodiments, certain features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

While only certain features of the disclosure have been illustrated and described herein, many modifications and changes will occur to those skilled in the art. For example, while the embodiments described herein include a specific logic organization for private information protection services, substantially similar benefits provided by the present invention may be obtained by trivial structural alterations such as changes in name or in non-substantial changes to the mode of operation of the data structures. It is, thus, to be understood that the appended claims are intended to cover all such modifications and changes as fall within the true spirit of the invention.

Figure 1:
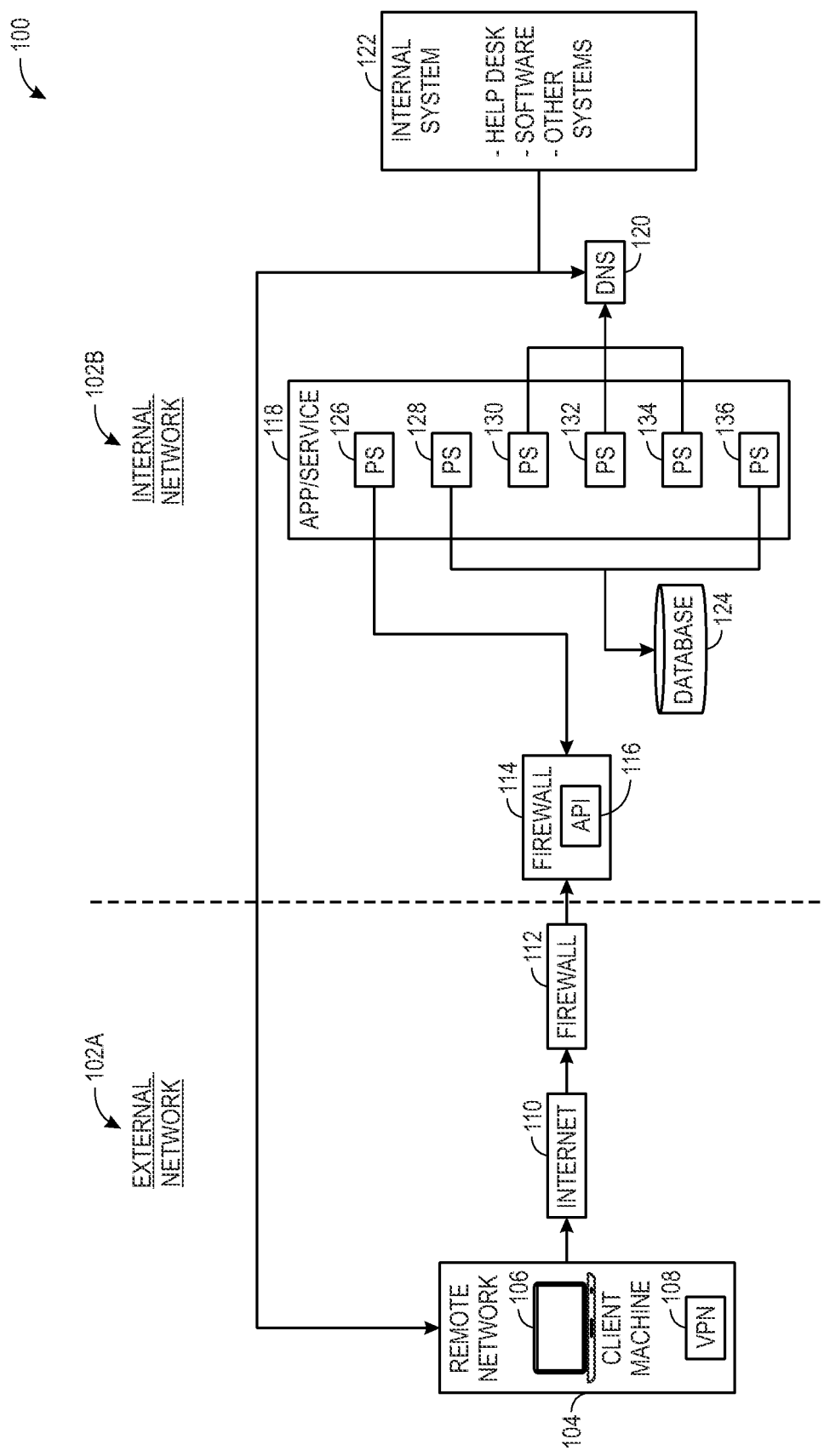
FIG. 1 is a schematic diagram, illustrating a system for providing distributed DNS services, in accordance with embodiments of the present disclosure.

Turning first to a discussion of an overall system for providing a distributed domain name system (DNS) service, FIG. 1 is a block diagram, illustrating a system 100 for provision of a distributed DNS, in accordance with embodiments of the present disclosure. The system 100 includes electronic devices and/or services distributed amongst an external network 102A and an internal network 102B. For example, the External Network 102A includes a remote network 104 (e.g., a client machine 106 that connects to the Internal Network 102B via a virtual private network connection 108). More specifically, devices of the remote network 104 may traverse an external network firewall 112 and an internal network firewall 114 to access internal systems 115 of the Internal Network 102B.

Unfortunately, however, in traditional systems, electronic devices and/or services of the remote network 104 may not be accessed by the internal systems 115 via mapped namespaces provided by a domain name system (DNS) of the internal network 102B, as the DNS of the internal network 102B typically only includes DNS records for electronic devices and/or services within the internal network 102B (e.g. on the internal network 102B side of the firewall 114).

However, this may be remedied by the techniques described herein. In particular, an application programming interface (API) 116 associated with (e.g., hosted by) the firewall 114, may provide client status information for remote client electronic devices and/or services that are accessing the internal network 102B through the firewall 114. For example, this client status may include a machine name, user account identification, Internet Protocol (IP) address, and/or other identifying information of remote client electronic devices and/or services (e.g., client machine 106) that are accessing the internal network 102B. The client status information may include other status information as well, such as a particular VPN 108 used to access the internal network 102B and/or other characteristics of the client machine 106.

The distributed DNS service 118 may use the client status provided by the API 116, along with records of a distributed DNS datastore/database 124 to identify DNS record modifications to make to the internal network DNS 120, such that the remote electronic devices and/or services of the remote network (e.g., client machine 106) that are communicatively coupled to the internal network 102B may be registered with the DNS 120. By registering these remote electronic devices and/or services with the DNS 120, the internal systems 115 may access the remote electronic devices and/or services by a mapped namespace provided by the DNS 120, rather than merely being able to access these remote electronic devices and/or services via a specific IP address. For example, as illustrated by processing step 126, the distributed DNS service 118 may retrieve client status information from the firewall API 116.

At processing step 128, the distributed DNS service 118 may check the database 124 for records of previously logged in users/client electronic devices and/or services. This helps the distributed DNS service 118 understand if DNS records of the DNS 120 should be added, removed, and/or modified based upon the current client status information.

At processing step 130, the distributed DNS service 118 retrieves all DNS record types (e.g., standardized DNS record types and/or DNS vendor-specific DNS record types) for currently logged in remote electronic devices/services, as indicated by the client status information. If such records exist, the distributed DNS service 118 determines whether adjustments to these records should be made. For example, in some situations, an IP address of the remote electronic device and/or service may change, resulting in mis-matched IP addresses between the remote electronic device and/or service and its corresponding DNS record(s) in the DNS 120. When such adjustments should be made, the distributed DNS service 118 submits the adjustments to the DNS 120.

At processing step 132, the distributed DNS service 118 may identify remote electronic devices and/or services that are not currently logged into the internal network 102B, but that do have entries in the DNS 120. This may be done by querying the DNS 120 directly for DNS entries 120 that have a particular indication (e.g., in metadata) that indicates an entry implemented by the distributed DNS service 118. However, in other embodiments, to reduce processing of the DNS 120, the database 124 may maintain a list of current DNS entries of the DNS 120 sourced from the distributed DNS service 118.

A list of the remote electronic devices and/or services represented by these records may be compared with the remote client status information to identify DNS entries that should be deleted from the DNS 120, due to lack of the remote electronic device and/or service being logged into the internal network 102B. In this manner, DNS 120 records may dynamically change as remote electronic device and/or services log off the internal network 102B.

At processing step 134, remote electronic devices and/or services that are logged into the internal network 102B (as indicated by the remote client status information) but do not have corresponding DNS entries in the DNS 120 are identified. Upon identifying these remote electronic devices and/or services, new DNS entries for these remote electronic devices and/or services may be generated and submitted for registration with the DNS 120. For example, a namespace (e.g., computer name) to IP address mapping may be provided for entry as one or more DNS records of the DNS 120. Thus, as may be appreciated, as new remote electronic devices and/or services log on to the internal network 102B, they may be registered with the DNS 120, enabling the internal systems 115 to access these remote electronic devices and/or services using names that are mapped to the IP addresses of the remote electronic devices and/or services.

At processing step 136, as mentioned above, indications of the modifications to the DNS 120 made by the distributed DNS service 118 may be stored in the database 124. This may help to ensure that DNS entries attributed to the distributed DNS service 118 are easily identified for subsequent modification determinations (e.g., processing steps 126-136).

Figure 2:
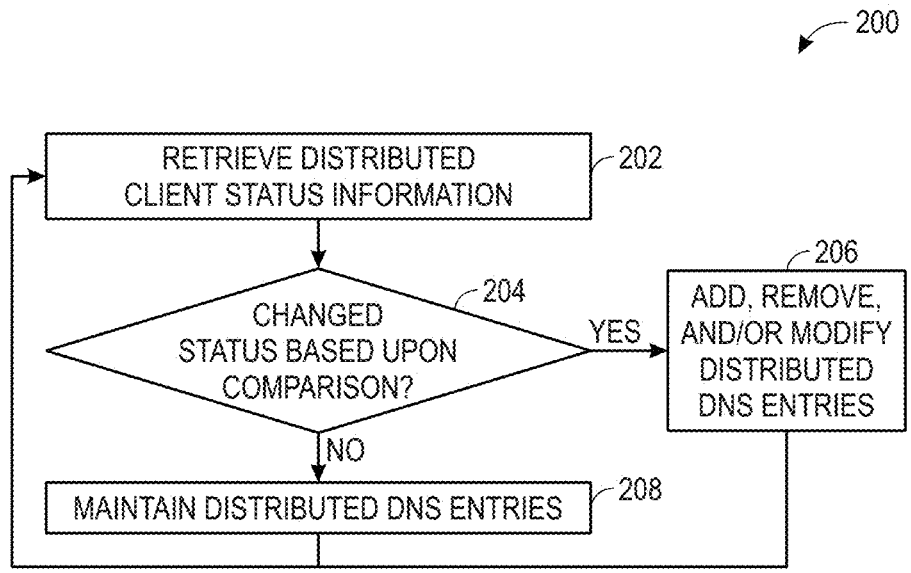
FIG. 2 is a flowchart, illustrating a process for providing distributed DNS services, in accordance with an embodiment of the present disclosure.

FIG. 2 is a flowchart, illustrating a process 200 for providing distributed DNS services, in accordance with an embodiment of the present disclosure. The process 200 begins by retrieving the remote client status information of the internal network (block 202). For example, as discussed above, this client status information may be obtained from an internal network firewall API and/or other data providing service that is aware of remote client status of the internal network. In some embodiments, the remote client status information includes: an indication of external network client devices and/or services that have connected to the internal network. Further, the remote client status information may include connection details for the connected remote client devices and/or services, such as an IP address along with other information about the remote client device and/or service, such as a Media Access Control (MAC) address, Device and/or Service Name, Account Login Name associated with the remote device and/or service, etc. A unique portion of this information about the remote electronic device and/or service may be used as a name mapping for the DNS entries created for a particular remote client device and/or service. For example, the Device and/or Service name of a particular remote client device and/or service may be used as a name mapped to the IP address for a DNS record.

Next, the retrieved client status information is compared with a current set of distributed DNS service entries (block 204). For example, as mentioned above, a database and/or the DNS service may be polled for a current set of entries/records sourced from the distributed DNS service. The list of current logged in remote clients from the client status information is compared to the list of DNS entries to identify modifications (e.g., additions, deletions, and/or modifications) to be made to the DNS entries of the DNS. This is described in more detail with regard to FIG. 3.

Once the DNS modifications are identified, the additions, deletions, and/or modifications are submitted to the DNS for updating the internal network DNS (block 206). As will be described in more detail below, this may be done by accessing a DNS service API that enables additions, deletions, and/or modifications to be made to the internal network DNS. In some instances, when no modifications are identified, the current remote DNS entries may be maintained without change (block 208).

The process 200 may be periodically re-executed to identify and implement subsequent changes to the distributed DNS entries based upon updated remote client status information. When determining the periodicity of running the process 200, there may be tradeoffs between a polling interval/rate of refresh of entries and processing costs for updating the DNS. For example, the shorter the period between the re-execution of the process 200, the more processing cost there may be to the DNS service. As will be discussed in more detail below, in some embodiments, certain DNS entry modifications may be prioritized over others. Further, batch submission of DNS entry modifications may be implemented to increase processing efficiencies of the DNS entry modifications. For example, providing individual DNS entry modifications to the DNS service may increase processing costs on the DNS service. For example, a request and response may need to be processed for each entry modification when sent individually. In contrast, when sent in batches, a single request of a batch of entry modifications may be received, followed by a single response. This is discussed in more detail with regard to FIG. 4.

Further, the longer the period between the re-execution of the process 200, the more likely that outdated remote DNS entries may remain in the internal network DNS. The polling interval determinization, in some embodiments, may be dynamically altered based upon certain characteristics, as will be discussed in more detail with regard to FIG. 5.

Figure 3:
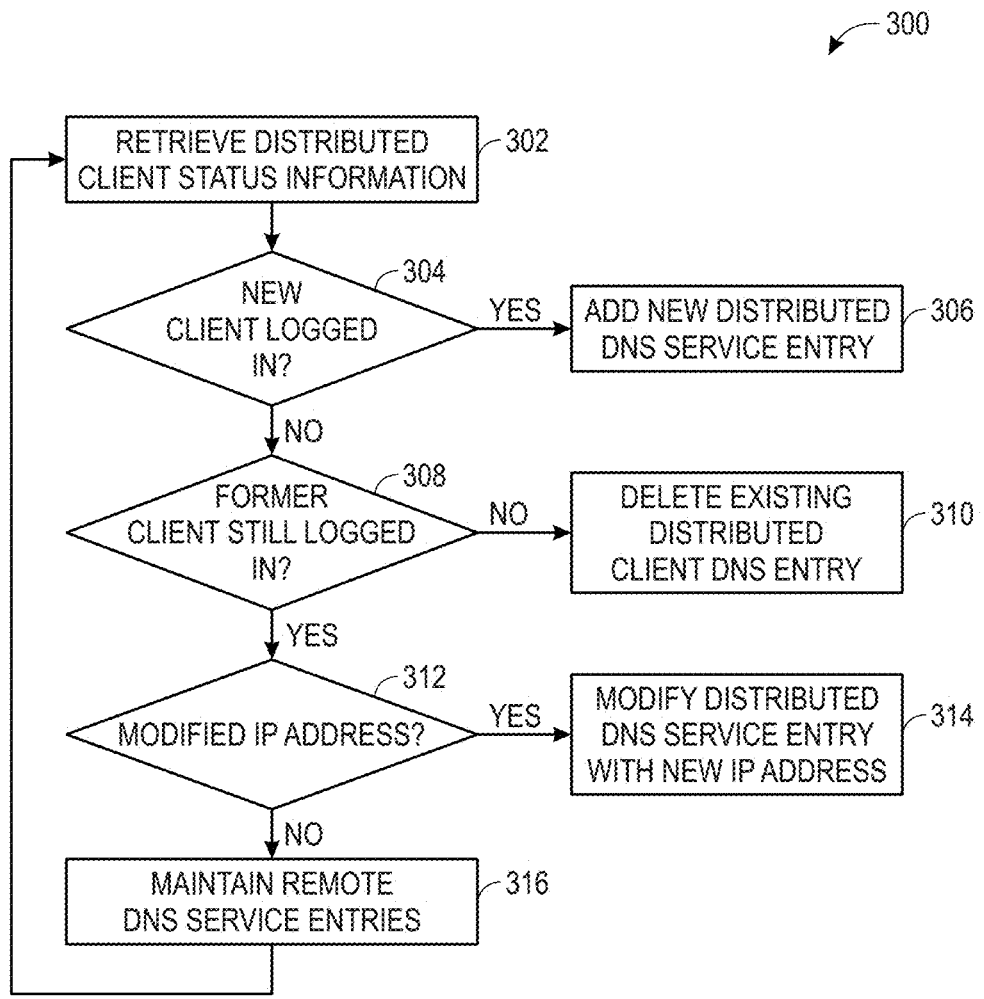
FIG. 3 is a flowchart, illustrating a process for modifying DNS entries based upon distributed client status, in accordance with an embodiment of the present disclosure.

Having discussed the basic process for FIG. 3 is a flowchart, illustrating a process 300 for modifying DNS entries based upon distributed client status, in accordance with an embodiment of the present disclosure. The process 300 begins by retrieving the distributed client status information, as described above (block 302).

The process 302 includes determining whether new distributed clients have logged in (block 304). This may be determined by identifying distributed clients indicated as logged in by the client status information that do not have corresponding entries in the distributed DNS service database and/or the DNS service.

When new distributed clients exist, new distributed DNS service entries for these clients may be generated and submitted to the DNS system for addition (e.g., via a DNS entry request) (block 306). For example a request to add a DNS entry mapping an IP address of the client with a name of the client may be submitted to the DNS service.

The process also includes determining whether a formerly logged in distributed client is still logged in (decision block 308). These clients may be identified by determining if there are distributed clients with DNS entries and/or entries in the distributed DNS service database that are not indicated as logged in in the current distributed client status information. When former distributed clients are not still logged on to the remote network, the existing distributed client DNS entries for the former distributed clients are deleted (e.g., by submitting a DNS entry deletion request to the DNS service).

The process 300 also includes identifying whether an IP address of logged in distributed clients has changed (decision block 312). For example, it may be possible for distributed clients to obtain a new IP address in between polling periods of the distributed DNS system. In such a case, the updated IP address should be updated in the distributed DNS entries corresponding to the distributed client. To identify such distributed clients, clients in the distributed client status information that are indicated as logged in to the internal network may be compared with the distributed DNS entries associated with these distributed clients to identify whether IP addresses of the distributed client status information matches the distributed DNS entries. When the IP addresses do not match, this indicates that the distributed client's IP address has changed. In such a case, the distributed DNS service entries associated with the distributed client may be updated with the IP address of the distribute client that is provided in the distributed client status information.

When no new distributed clients have logged in, all of the former distributed clients are still logged in, and there are no distributed clients with a modified IP address, the distributed DNS service entries may be maintained without modification (block 316). As mentioned above, the process 300 may be repeated a periodic rate (a "polling rate") to dynamically adjust the distributed DNS entries based upon subsequent changes to the distributed client status information.

Figure 4:
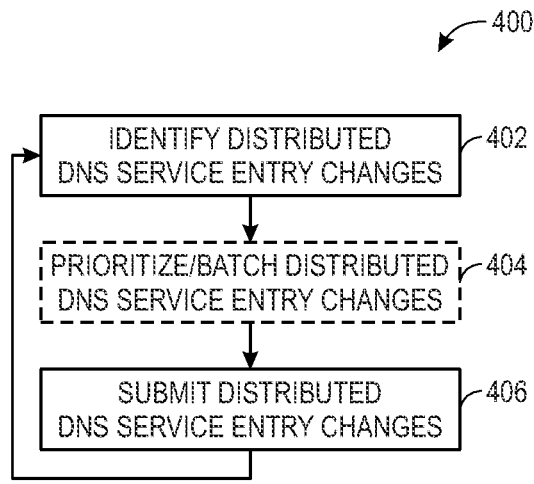
FIG. 4 is a flowchart, illustrating batching and/or prioritizing updates to distributed DNS services, in accordance with an embodiment of the present disclosure.

Turning now to a discussion of prioritizing and/or batching DNS entry modifications, FIG. 4 is a flowchart, illustrating a process 400 for batching and/or prioritizing updates to distributed DNS services, in accordance with an embodiment of the present disclosure. The process 400 begins with identifying the distributed DNS service entry modifications (additions, deletions, and/or changes) to the distributed DNS entries (block 402).

As mentioned above, the distributed DNS entry modifications may be prioritized and/or batched for provision to the DNS system (block 404). The prioritization may include prioritizing certain DNS entries over others. For example, in some embodiments, where efficient access to newly logged in distributed clients is desired, DNS entry additions may be prioritized over deletions and/or IP address modifications. In some embodiments, where particular important distributed clients exist, entries of these particular distributed clients may be prioritized over others. The prioritization rules may be stored in the distributed DNS service database or other data store (e.g., a flat file).

Further, as mentioned above, batching of distributed DNS entry modifications may be implemented. For example, rather than submitting individual distributed DNS entry modifications, batches of distributed DNS entry modifications may be sent across in one request. This may increase processing efficiencies, by limiting a number of requests sent to and/or responses received from the DNS system.

The prioritized and/or batched distributed DNS entries may then be submitted to the DNS system (block 406). For example, as mentioned above, these DNS entry modifications may be submitted via an API of the DNS system.

Figure 5:
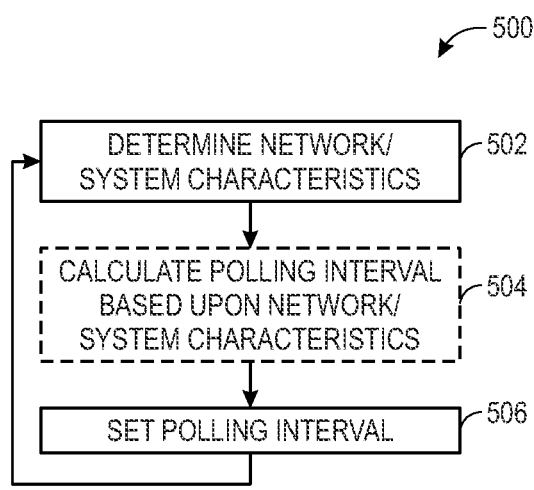
FIG. 5 is a flowchart, illustrating variable distributed client status polling, in accordance with an embodiment of the present disclosure.

As mentioned above, the polling interval for identifying and/or submitting distributed DNS service modifications may be dynamically adjusted. FIG. 5 is a flowchart, illustrating a process 500 for variable distributed client status polling, in accordance with an embodiment of the present disclosure. The process 500 begins by determining network and/or other system characteristics that may impact the polling interval (block 502). For example, such factors may include the number of distributed clients logged on to the internal network, a current processing load of the DNS service, etc.

Next, a polling interval is calculated based upon the determined network/system characteristics (block 504). For example, as mentioned above, during periods where a significant number of modifications may be likely (e.g., when a threshold number of distributed clients are logged in), the polling interval may be reduced, to reduce the processing load on the DNS service. Further, this may provide additional time to register the distributed DNS entry modifications with the DNS system.

As another example, when the DNS processing load is above a threshold amount, this may indicate that there is a heightened risk of error/failure of the DNS system. Thus, it may be desirable to reduce the polling interval and/or temporary halt polling of distributed DNS entry modification.

Once the polling interval is determined, the polling interval may be set (block 506). Thus, the identification and implementation of distributed DNS entry modifications may be implemented a dynamically adjustable rate (the polling rate).

Figure 6:
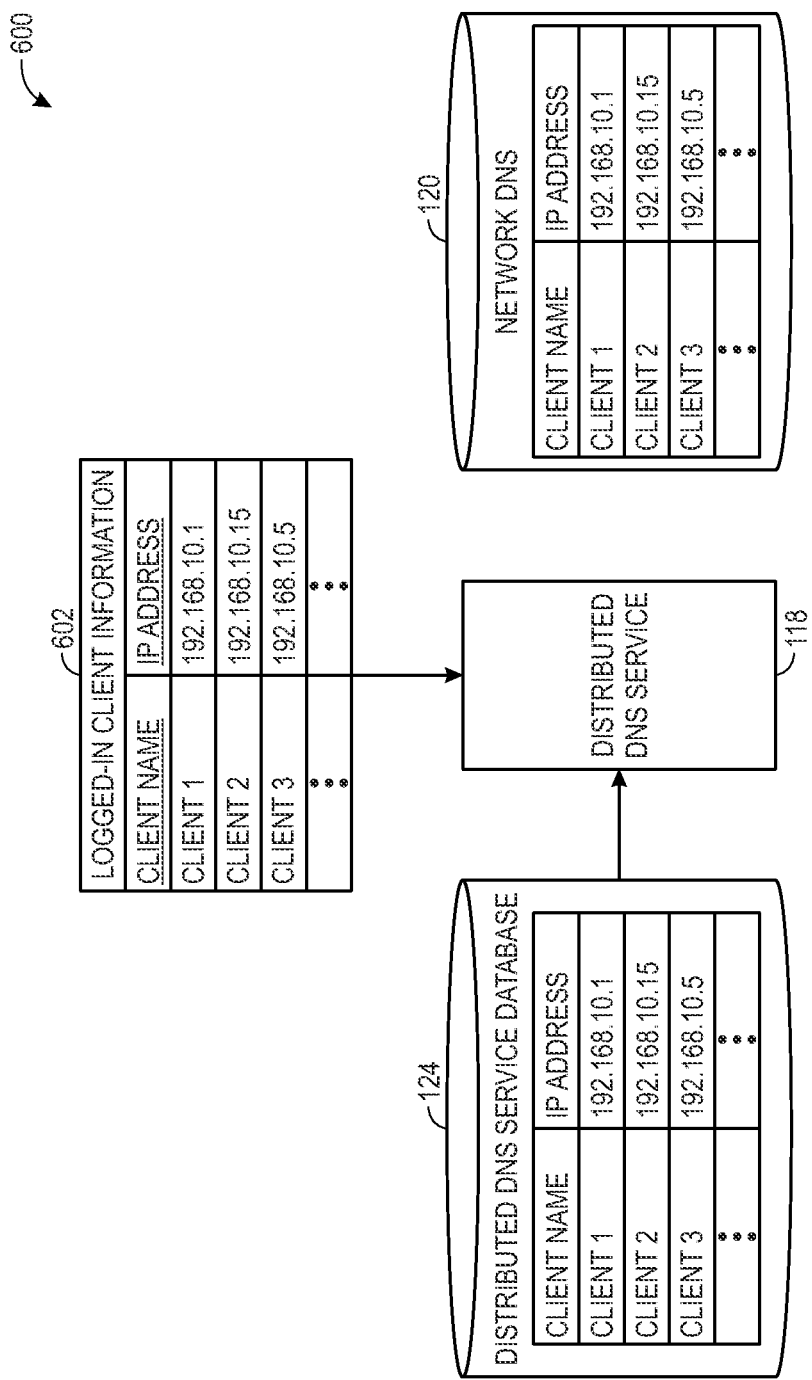
FIG. 6 is a schematic diagram, illustrating updates made by the distributed DNS service when no changes are detected, in accordance with an embodiment of the present disclosure.

FIGS. 6-9 illustrate various DNS entry modifications that may be provided by the distributed DNS service based upon the distributed client status information. FIG. 6 is a schematic diagram 600, illustrating updates made by the distributed DNS service when no changes are detected, in accordance with an embodiment of the present disclosure. No new clients have logged on, as there are no new entries in the client status information (e.g., the logged-in client information 602) that are not in the distributed DNS service database 124. Further, there are no distributed clients that have logged off, as there are no client names in the distributed DNS service database 124 that are not in the logged-in client information 602. Additionally, no distributed client IP addresses have changed, as both the logged-in client information 602 and the distributed DNS service database 124 include common client names and associated IP addresses. Accordingly, as illustrated, the distributed DNS service 118 refrains from providing distributed DNS entry modifications to the Network DNS 120.

Figure 7:
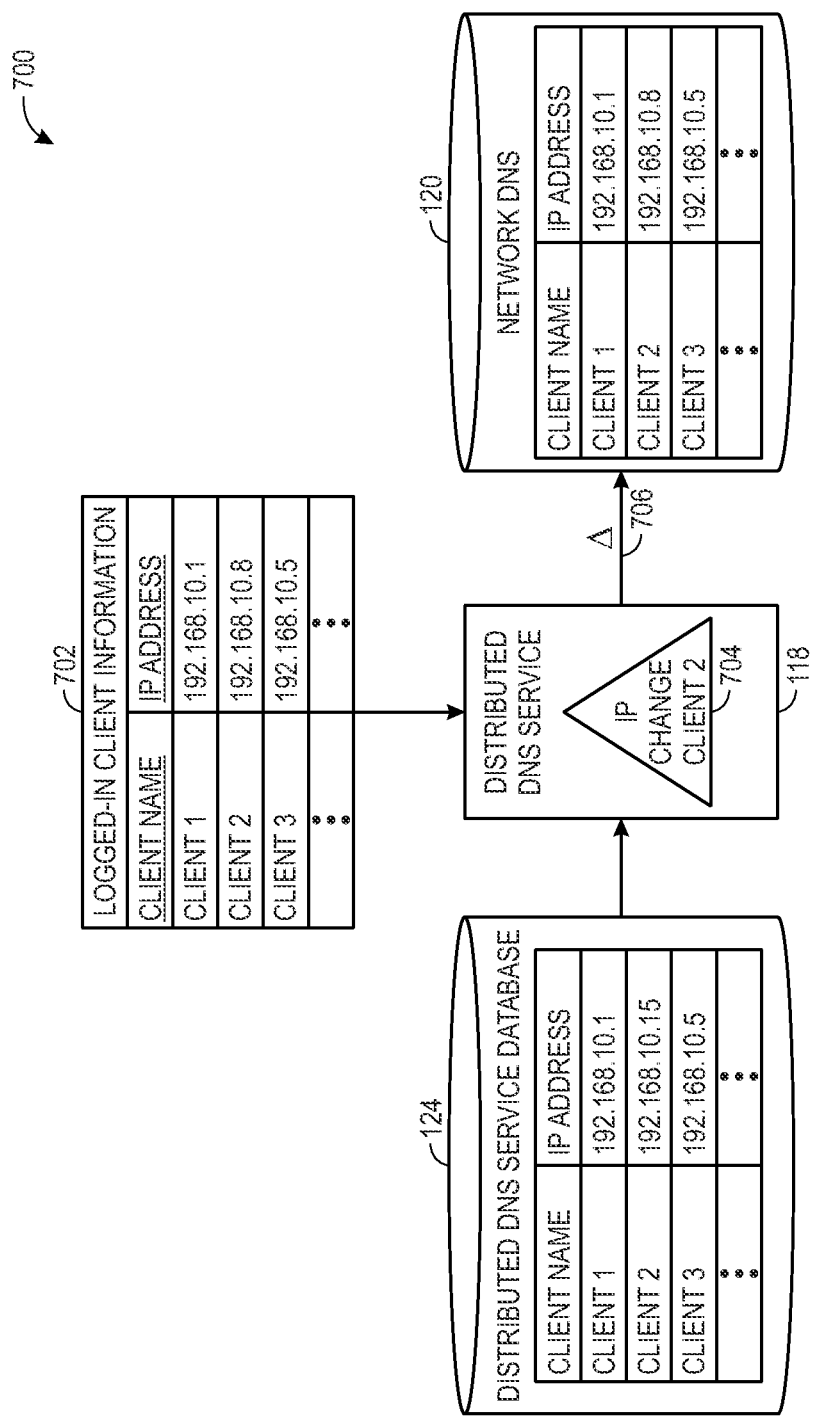
FIG. 7 is a schematic diagram, illustrating updates made by the distributed DNS service when a distributed client change is detected, in accordance with an embodiment of the present disclosure.

FIG. 7 is a schematic diagram 700, illustrating updates made by the distributed DNS service when a distributed client change is detected, in accordance with an embodiment of the present disclosure. No new clients have logged on, as there are no new entries in the client status information (e.g., the logged-in client information 702) that are not in the distributed DNS service database 124. Further, there are no distributed clients that have logged off, as there are no client names in the distributed DNS service database 124 that are not in the logged-in client information 702. However, distributed client IP addresses have changed, as the logged-in client information 702 indicates that Client2 is associated with IP address 192.168.10.8, while the distributed DNS service database 124 indicates that Client2 is associated with IP address 192.168.10.15. Accordingly, as illustrated, the distributed DNS service 118 identifies that a modification 704 of the IP address associated with Client 2 should be updated to the IP address provided in the logged-in client information 702 (e.g., 192.168.10.8). This is submitted to the internal network DNS 120 as a DNS modification request 706 (e.g., via an API of the internal network DNS 120), resulting in an updated DNS entry for Client2 with the IP address provided in the logged-in client information 702. Thus, internal systems of the internal network can access Client2 via the name Client2 or the IP address 192.168.10.8.

Figure 8:
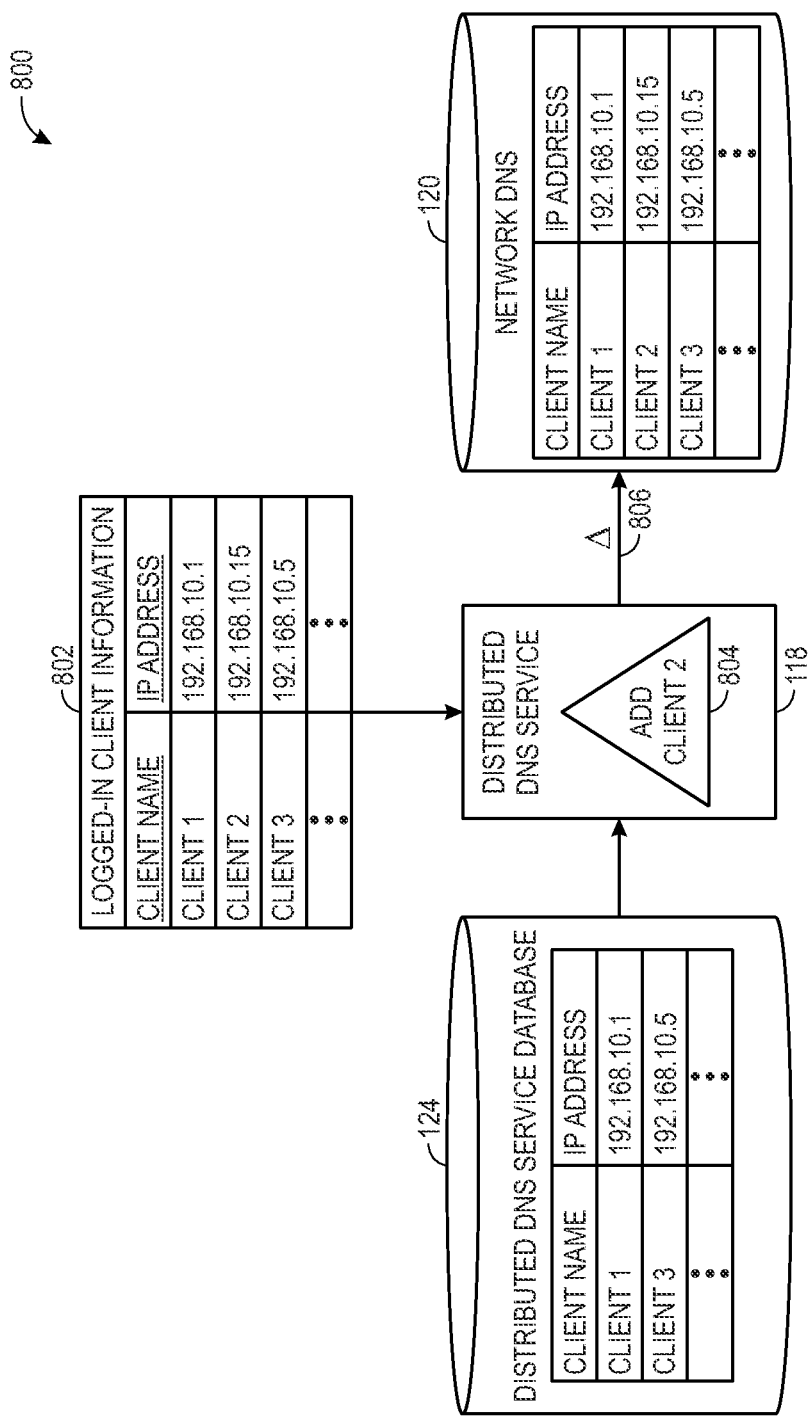
FIG. 8 is a schematic diagram, illustrating updates made by the distributed DNS service when a new distributed client is detected, in accordance with an embodiment of the present disclosure.

FIG. 8 is a schematic diagram 800, illustrating updates made by the distributed DNS service when a new distributed client is detected, in accordance with an embodiment of the present disclosure. A new client has logged on, as there is new entry (e.g., Client2) in the client status information (e.g., the logged-in client information 802) that is not in the distributed DNS service database 124. There are no distributed clients that have logged off, as there are no client names in the distributed DNS service database 124 that are not in the logged-in client information 802. Additionally, no distributed client IP addresses have changed, as both the logged-in client information 802 and the distributed DNS service database 124 include common client names and associated IP addresses. Accordingly, as illustrated, the distributed DNS service 118 identifies that a modification 804 of an addition of a DNS entry for Client2 is generated. This is submitted to the internal network DNS 120 as a DNS modification request 806 (e.g., via an API of the internal network DNS 120), resulting in an added DNS entry for Client2. Thus, internal systems of the internal network can access Client2 via the name Client2 or the IP address 192.168.10.15, which was provided by the logged-in client information 802.

Figure 9:
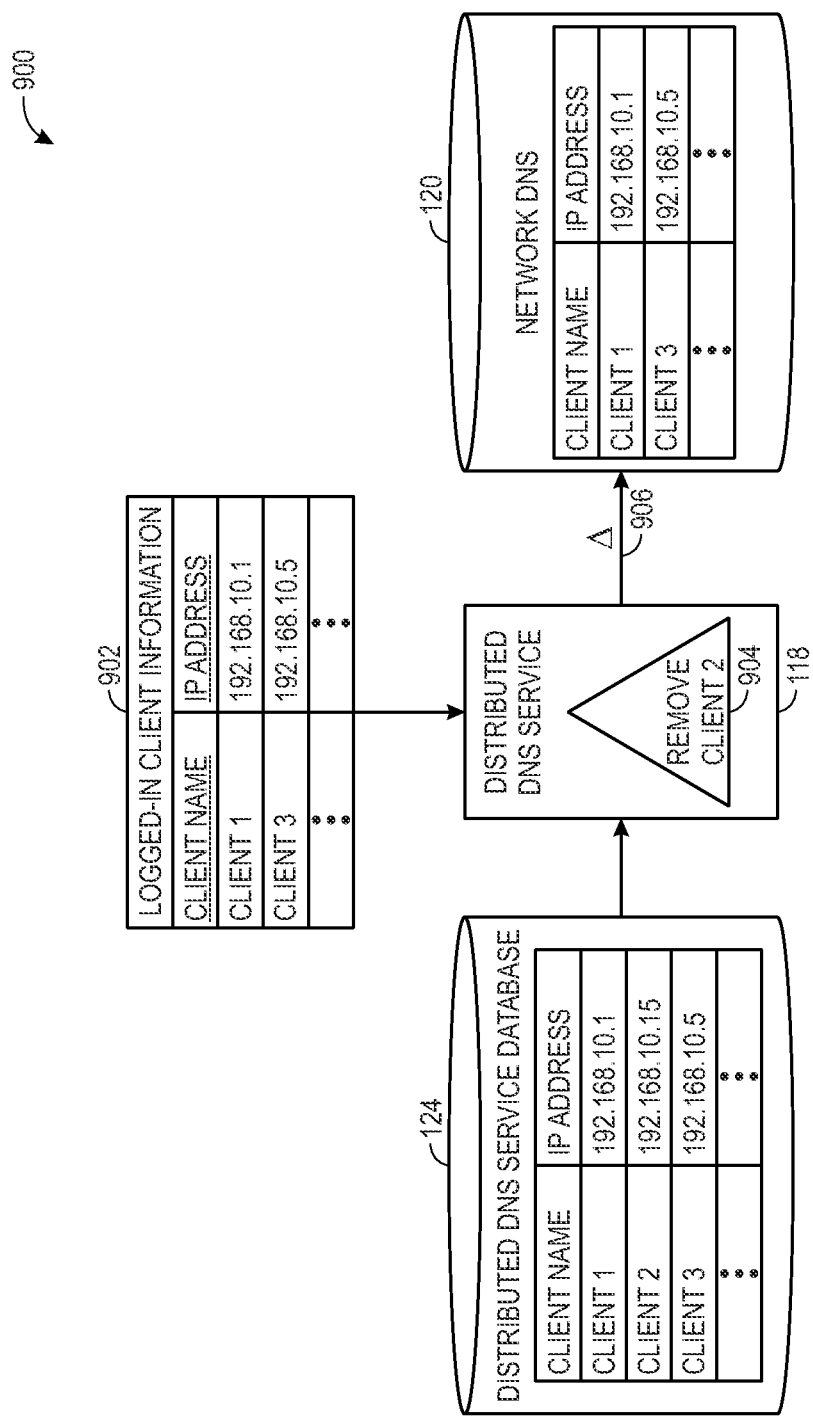
FIG. 9 is a schematic diagram, illustrating updates made by the distributed DNS service when a distributed client is detected as disconnected from the network, in accordance with an embodiment of the present disclosure.

FIG. 9 is a schematic diagram 900, illustrating updates made by the distributed DNS service when a distributed client is detected as disconnected from the network, in accordance with an embodiment of the present disclosure. No new clients have logged on, as there are no new entries in the client status information (e.g., the logged-in client information 902) that are not in the distributed DNS service database 124. However, a former client is identified as having logged off the internal network, as there is a client name in the distributed DNS service database 124 that is not in the logged-in client information 902. No distributed client IP addresses have changed, as both the logged-in client information 902 and the distributed DNS service database 124 include common client names and associated IP addresses. Accordingly, as illustrated, the distributed DNS service 118 identifies that a modification 904 of a deletion of a DNS entry for Client2 is generated. This is submitted to the internal network DNS 120 as a DNS modification request 906 (e.g., via an API of the internal network DNS 120), resulting in deletion of the DNS entry for Client2 at the Network DNS. Thus, this DNS mapping to a no longer logged in distributed client will no longer be present in the Network DNS 120.

The systems and techniques provided herein provide significant value in a world with increasing online activity. By providing systems that proactively retrieve and analyze cross-entity behavioral attributes to identify personalized digital advice, more accurate personalizing of online experiences may be provided.

The invention claimed is:

1. A tangible, non-transitory, computer-readable medium comprising instructions that, when executed by one or more processors of a computer, cause the computer to implement Domain Name System (DNS) modifications, by:
   receiving distributed client status information, the distributed client status information comprising an indication of a plurality of external clients on an external network that are connected to an internal network; and
   updating entries of a DNS of the internal network, by:
      comparing the distributed client status information with a list of distributed clients having a corresponding distributed DNS entry in the DNS of the internal network;
      based upon the comparison, when the comparing indicates that one or more distributed clients have a changed status:
         identifying one or more modifications to be made to the DNS to refresh the DNS with entries based upon the distributed client status information; and
         submitting a request to the DNS to implement the one or more modifications, enabling internal systems of the internal network to access the external clients based upon information in the DNS; and
      otherwise, when the comparing does not indicate that the one or more distributed clients have a changed status, cause the DNS to maintain the entries without changes for the one or more distributed clients.

2. The computer-readable medium of claim 1, comprising instructions that, when executed by the one or more processors, cause the computer to iteratively implement the distributed DNS modifications at periodic intervals.

3. The computer-readable medium of claim 2, comprising instructions that, when executed by the one or more processors, cause the computer to implement the distributed DNS modifications at periodic intervals defined by a dynamically adjustable polling rate.

4. The computer-readable medium of claim 3, comprising instructions that, when executed by the one or more processors, cause the computer to identify the dynamically adjustable polling rate by:
   identifying one or more characteristics of the internal network; and
   calculating the dynamically adjustable polling rate based upon the characteristics.

5. The computer-readable medium of claim 4, wherein the one or more characteristics comprise a number of distributed clients logged on to the internal network.

6. The computer-readable medium of claim 4, wherein the one or more characteristics comprise a current processing load of the DNS of the internal network.

7. The computer-readable medium of claim 1, wherein the one or more modifications comprise a plurality of modifications; and
   wherein the computer-readable medium comprising instructions that, when executed by the one or more processors, cause the computer to implement the distributed DNS modifications by:
      batching the plurality of modifications in a single modification request to the DNS.

8. The computer-readable medium of claim 1, comprising instructions that, when executed by the one or more processors, cause the computer to implement the distributed DNS modifications, by:
   retrieving the distributed client status information from an application programming interface associated with a firewall of the internal network.

9. The computer-readable medium of claim 1, comprising instructions that, when executed by the one or more processors, cause the computer to implement the distributed DNS modifications, by:
   submitting the request to the DNS via an application programming interface of the DNS.

10. The computer-readable medium of claim 1, comprising instructions that, when executed by the one or more processors, cause the computer to implement the distributed DNS modifications, by:
    identifying one or more addition modifications to be made to the DNS based upon an external client being present in the distributed client status information, but not in the list of distributed clients having a corresponding DNS entry in the DNS of the internal network.

11. The computer-readable medium of claim 1, comprising instructions that, when executed by the one or more processors, cause the computer to implement the distributed DNS modifications, by:
    identifying one or more deletion modifications to be made to the DNS based upon an external client being present in the list of distributed clients having a corresponding DNS entry in the DNS of the internal network, but not in the distributed client status information.

12. The computer-readable medium of claim 1, comprising instructions that, when executed by the one or more processors, cause the computer to implement the distributed DNS modifications, by:
    identifying one or more Internet Protocol (IP) address modifications to be made to the DNS based upon an external client being present in the list of distributed clients having a corresponding DNS entry in the DNS of the internal network with a first IP address and also in the distributed client status information, but with a second IP address different than the first IP address.

13. The computer-readable medium of claim 12, comprising instructions that, when executed by the one or more processors, cause the computer to implement the distributed DNS modifications, by:
    generating the one or more IP address modifications to replace the first IP address with the second IP address in the distributed client status information.

14. A system, comprising:
    an internal network comprising a domain name system (DNS) comprising a first one or more processors configured to associate domain names with one or more network entities; and
    a DNS service system comprising a second one or more processors configured to execute a DNS service, configured to implement DNS modifications, by:
       receiving distributed client status information, the distributed client status information comprising an indication of a plurality of external clients on an external network that are connected to an internal network; and
       updating entries of the DNS of the internal network, by:

comparing the distributed client status information with a list of distributed clients having a corresponding DNS entry in the DNS of the internal network;

based upon the comparison, when the comparing indicates that one or more distributed clients have a changed status:

identifying one or more modifications to be made to the DNS to refresh the DNS with entries based upon the distributed client status information; and submitting a request to the DNS to implement the one or more modifications, enabling internal systems of the internal network to access the external clients based upon information in the DNS; and otherwise, when the comparing does not indicate that the one or more distributed clients have a changed status, cause the DNS to maintain the entries without changes for the one or more distributed clients.

15. The system of claim 14, wherein the internal network comprises a firewall and wherein the DNS service retrieves the distributed client status information from an application programming interface associated with the firewall.

16. The system of claim 14, wherein the distributed DNS service is configured to implement the distributed DNS modifications, by:

identifying one or more addition modifications to be made to the DNS based upon an external client being present in the distributed client status information, but not in the list of distributed clients having a corresponding DNS entry in the DNS of the internal network;

identifying one or more deletion modifications to be made to the DNS based upon an external client being present in the list of distributed clients having a corresponding DNS entry in the DNS of the internal network, but not in the distributed client status information;

identifying one or more Internet Protocol (IP) address modifications to be made to the DNS based upon an external client being present in the list of distributed clients having a corresponding DNS entry in the DNS of the internal network with a first IP address and also in the distributed client status information, but with a second IP address different than the first IP address; or any combination thereof.

17. The system of claim 14, wherein the distributed DNS service is configured to implement the distributed DNS modifications by:

prioritizing the one or more modifications based upon a type of the one or more modifications, based upon a corresponding external client associated with the one or more modifications, or both.

18. The system of claim 14, wherein the distributed DNS service is configured to implement the distributed DNS modifications, by:

batching a plurality of modifications in a single modification request to the DNS.

19. An internal network domain naming system (DNS) server of an internal network, comprising one or more processors, configured to:

receive one or more distributed DNS entry modifications to implement in the internal network DNS server, wherein the one or more distributed DNS entry modifications are provided by a distributed DNS service, configured to implement distributed DNS modifications, by:

receiving distributed client status information, the distributed client status information comprising an indication of a plurality of external clients on an external network that are connected to an internal network;

updating entries of a DNS of the internal network, by:

comparing the distributed client status information with a list of distributed clients having a corresponding DNS entry in the internal network DNS server;

based upon the comparison, when the comparing indicates that one or more distributed clients have a changed status:

identifying one or more modifications to be made to the internal network DNS server to refresh the internal network DNS server with entries based upon the distributed client status information; and submitting a request to the internal network DNS server to implement the one or more modifications, enabling internal systems of the internal network to access the external clients based upon information in the internal network DNS server; and otherwise, when the comparing does not indicate that the one or more distributed clients have a changed status, cause the DNS to maintain the entries without changes for the one or more distributed clients.

20. The internal network DNS server of claim 19, wherein the DNS server is configured to receive a plurality of distributed DNS entry modifications in a single batched transaction from the distributed DNS service.

* * * * *